July 8, 1947. A. SHELSTAD 2,423,799
HITCH PIN HOLDER
Filed April 3, 1946
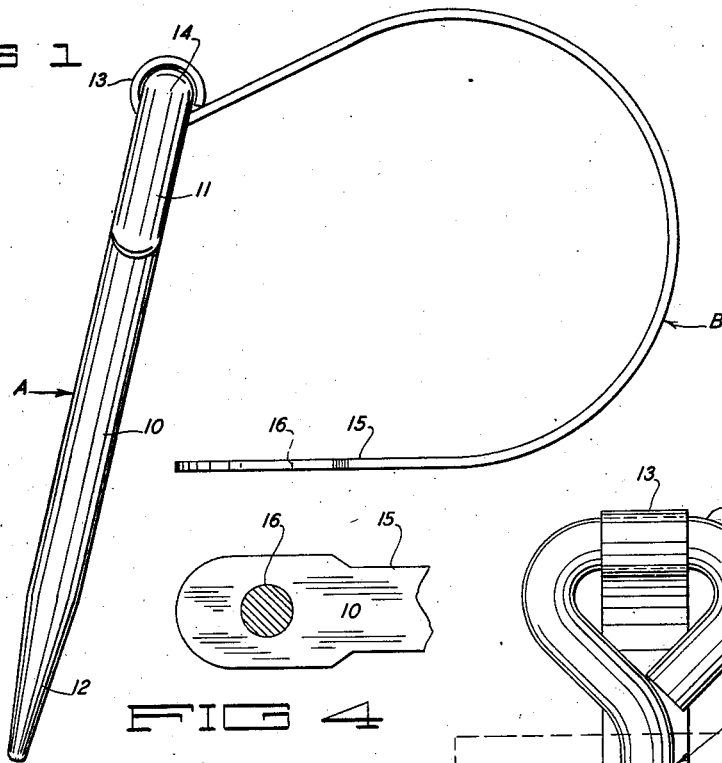
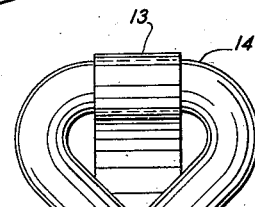
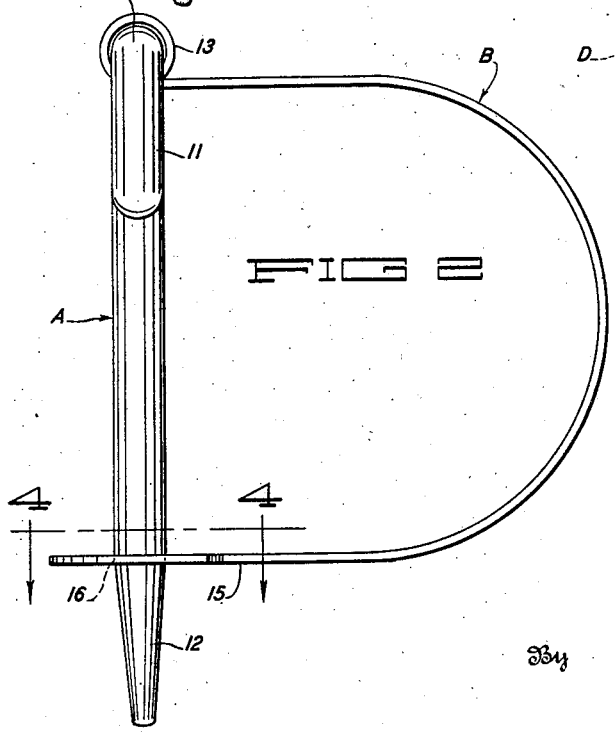
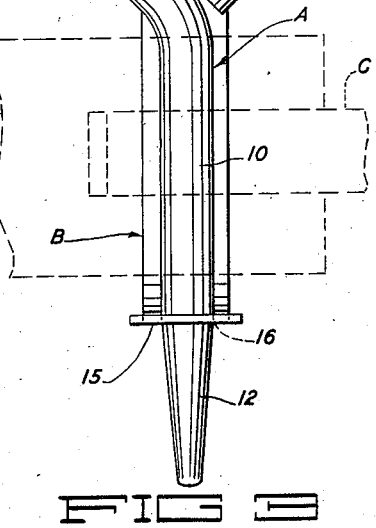
Inventor
ADOLPH SHELSTAD
By Carlsen + Hagle
Attorneys Patented July 8, 1947

2,423,799

UNITED STATES PATENT OFFICE 2,423,799

HITCH PIN HOLDER

Adolph Shelstad, St. Paul, Minn.

Application April 3, 1946, Serial No. 659,244

1 Claim. (Cl. 280—33.15)

This invention relates generally to improvements in hitch or coupling pins as used for making draft connections between vehicles, implements and the like, and more specifically to a pin embodying means for holding it in place against accidental displacement.

It is well known that the ordinary hitch or coupling pin as used for this purpose has a tendency to jump out of place due to vibration or travel over rough ground and it is the primary object of my invention to provide a pin having permanently attached thereto means to hold the pin in place in a positive manner, but which is nevertheless readily manipulated to release the pin when required. Another object is to provide a hitch pin holder in the form of a simple, one piece, U-shaped or bowed spring pivotally connected at one end with the upper end of the pin and having at its other end an opening adapted to fit over the lower end of the pin. When so positioned the spring or holder extends about the top, side and bottom of the coupled draft member to prevent displacement of the pin, but when it is desired to remove the pin the spring may be pulled or sprung down to release its apertured end from the pin and then swung upwardly out of the way as the pin is withdrawn.

Fig. 1 is an elevational view of my improved coupling pin and holder, with the spring released for insertion or removal of the pin.

Fig. 2 is a similar view but with the holder spring engaged or in its operative position.

Fig. 3 is a side elevation, with two coupled hitch members shown in dotted lines, and the pin retained in place therein.

Fig. 4 is a fragmentary sectional view along the line 4—4 in Fig. 2.

Referring now more particularly and by reference characters to the drawing, I show therein a hitch or coupling pin indicated generally at A, and a holder, indicated generally at B, therefor. The pin A has a straight shank portion 10 long enough to pass downwardly through the usual registering openings in a pair of hitch or draft members C and D and depend well below these parts, in the usual fashion, and at its upper end the pin is formed into an eye 11 to prevent its dropping through said openings. The lower end of the pin is tapered as indicated at 12 to facilitate insertion through the openings.

The eye 11 and tapered end 12 of the pin also cooperate or serve useful functions in connection with the holder B which will now be described in detail.

This holder comprises a single piece or strap of spring material of bowed or substantially U-shape and one end thereof is looped at 13 to pivotally fit about a straight portion 14 of the eye 11 to thus permanently and swingably connect the pin and its holder. From this point the spring curves outwardly and then back toward the lower end of the pin and this opposite or lower end 15 of the spring is provided with an aperture 16 adapted to slip upwardly over the tapered end 12 of the pin as seen in Figs. 2 and 3. The size of the opening 16 is such that it will fit the pin up to about the start of its tapered end 12 and will there be stopped, and the spring is so tensioned that the end 15 tends to move upwardly beyond such position. When released and swung aside the spring will thus assume the shape of Fig. 1.

In use, the spring is released at its lower end from the pin A and swung aside and the pin is then dropped through the draft members C and D. The spring is next swung back down toward the pin and by grasping the lower end 15 of the spring it may be pulled or sprung downwardly until the aperture 16 registers with the lower tapered end of the pin. When now released the apertured end of the spring will snap or slip upwardly on the pin until stopped by the aperture 16 jamming near the upper end of the tapered portion of the pin. Thus the spring or holder will extend around the side and below the draft or hitch members C and D and will obviously prevent the pin from slipping upwardly from its place under all normal travel conditions. To release the pin, on the other hand, it is merely necessary to grasp the lower end portion of the spring and force it down until it clears the lower end of the pin, then swing the spring aside and withdraw the pin from the hitch members.

Obviously this device is exceedingly simple and inexpensive in construction, is readily operated and not likely to become broken or disassembled in use, and is positive and safe in its operation.

It is understood that suitable modifications may be made in the structure as disclosed, provided such modifications come within the spirit and scope of the appended claim.

Having now therefore fully illustrated and described my invention, what I claim to be new and desire to protect by Letters Patent is:

In a hitch pin and holder of the character described, a pin having an eye with a straight portion at one end, a holder spring of bowed shape formed with a loop at one end around the straight portion of said eye to hingedly connect the pin and spring, the loop having the same width as the spring, and the opposite end of the spring being transversely widened and having an aperture in the widened portion adapted to slip over the end of the pin opposite said eye, the said spring being tensioned to normally and yieldably draw its apertured end on the end of the pin.

ADOLPH SHELSTAD.

REFERENCES CITED

The following references are of record in the file of this patent:

UNITED STATES PATENTS

| Number | Name | Date |
| --- | --- | --- |
| 216,458 | Risser | June 10, 1879 |
| 638,710 | Hollar | Dec. 12, 1899 |
| 2,224,522 | Peterson | Dec. 10, 1940 |